US006594648B1

(12) United States Patent
Reisinger

(10) Patent No.: US 6,594,648 B1
(45) Date of Patent: Jul. 15, 2003

(54) METHOD FOR PROCESSING VARIABLE SERVICE DATA STRUCTURES AND DISPLAY TEXTS IN A PROCESSING MODULE AND ARRANGEMENT FOR THE IMPLEMENTATION OF THE METHOD

(75) Inventor: Katrin Reisinger, Oranienburg (DE)

(73) Assignee: Francotyp-Postalia AG & Co. KG, Birkenwerder (DE)

( * ) Notice: Subject to any disclaimer, the term of this patent is extended or adjusted under 35 U.S.C. 154(b) by 0 days.

(21) Appl. No.: 09/450,422

(22) Filed: Nov. 30, 1999

(30) Foreign Application Priority Data

Dec. 4, 1998 (DE) ........................................ 198 57 778

(51) Int. Cl.[7] ................................................ G06F 17/00
(52) U.S. Cl. ....................................... 705/409; 705/401
(58) Field of Search .......................... 705/60, 401, 404, 705/405, 409, 410

(56) References Cited

U.S. PATENT DOCUMENTS

| | | | | |
|---|---|---|---|---|
| 4,504,915 A | | 3/1985 | Daniels et al. | 364/466 |
| 4,928,249 A | | 5/1990 | Vermesse | 364/518 |
| 5,009,276 A | * | 4/1991 | Raikes et al. | 177/25.15 |
| 5,448,641 A | | 9/1995 | Pintsov et al. | 380/51 |
| 5,490,077 A | | 2/1996 | Freytag | 364/464.02 |
| 5,602,743 A | * | 2/1997 | Freytag | 705/408 |
| 5,606,508 A | | 2/1997 | Thiel | 364/464.2 |
| 5,699,258 A | | 12/1997 | Thiel | 364/464.19 |
| 5,707,158 A | | 1/1998 | Hansel et al. | 400/61 |
| 5,710,706 A | * | 1/1998 | Markl et al. | 705/409 |

FOREIGN PATENT DOCUMENTS

| | | | |
|---|---|---|---|
| DE | 4213278 | * | 10/1993 |
| DE | OS 196 17 586 | | 11/1997 |
| DE | 19622304 | * | 11/1997 |
| DE | OS 196 22 304 | | 11/1997 |
| DE | 19830055 | * | 12/1999 |
| DE | 4447404 | * | 3/2000 |
| DE | 19843249 | * | 3/2000 |
| DE | 19843252 | * | 3/2000 |
| EP | 0 099 666 | | 2/1984 |
| EP | 0 805 419 | | 11/1997 |

OTHER PUBLICATIONS

"Computer Dictionary The Compresensive Standard For Business, Scool, Library, and Home Second Edition", 1994, pp. 20 209 & 308; Microsoft Press A Division of Microft Corp. One Microsoft Way Redmond, Washington 98052-6399.*

"Die Programmiersprache," Schirmer, pp. 87, 96–97 (1985).

* cited by examiner

*Primary Examiner*—Edward R. Cosimano
(74) *Attorney, Agent, or Firm*—Schiff Hardin & Waite

(57) ABSTRACT

In a method and an arrangement for processing variable service data structures and display texts, a processing module is provided having a microprocessor, a program memory in which an operating program for the microprocessor is stored, and a non-volatile service data memory having first and second memory areas. Service data are stored in the second memory area and a root table is stored in the first memory area, the root table having a number of table items respectively associated with pointers for the addresses of the service data in the second memory area. Access to the second memory area from the microprocessor ensues exclusively through the root table by selection of a table item, within the context of the operating program, and service data are supplied to the microprocessor from the second memory area from an address identified by the pointer for the selected table item.

16 Claims, 2 Drawing Sheets

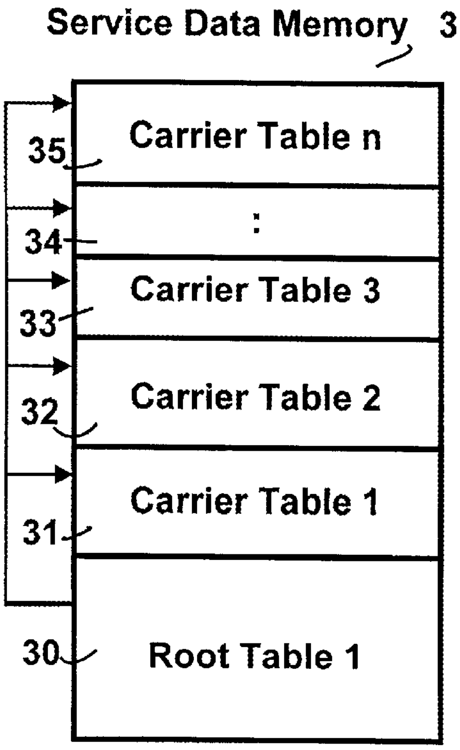
Fig. 3a
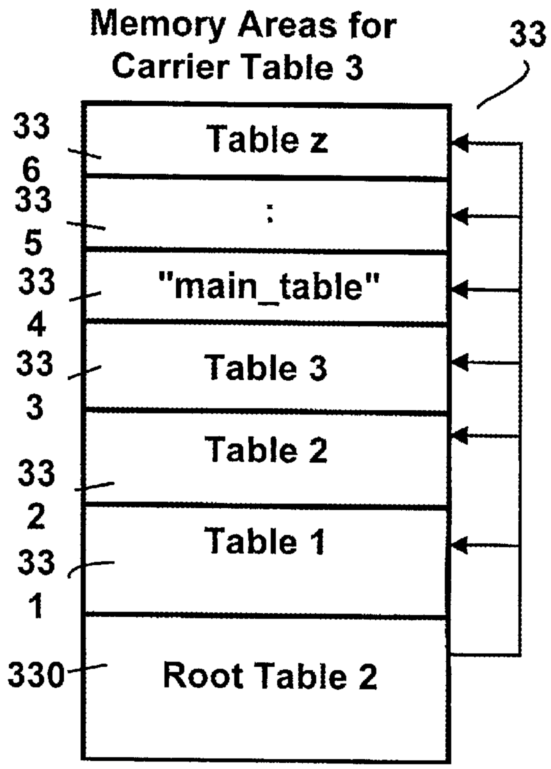
Fig.3b
Table 1
| Index | Text String | ID | VA | VA-M | VZ | VZ-M |
|---|---|---|---|---|---|---|
| 0 | "Domestic Letter" | K_BR_IN | BR | VA_M | IN | VZ_M |
| 1 | "Domestic Infobrief" | K_IB_IN | IB | VA_M | IN | VZ_M |
| 2 | "Domestic Infopost" | K_IP_IN | IP | VA_M | IN | VZ_M |
| 3 | "Domestic Postcard" | K_PK_IN | PK | VA_M | IN | VZ_M |
| 4 | "Domestic Book" | K_BU_IN | BU | VA_M | IN | VZ_M |
| 5 | "European Letter" | K_BR_EU | BR | VA_M | EU | VZ_M |
| .. | ... | ... | ... | ... | ... | ... |
| 15 | "Worldwide Package" | K_PA_WE | PA | VA_M | WE | VZ_M |
Fig. 4

METHOD FOR PROCESSING VARIABLE SERVICE DATA STRUCTURES AND DISPLAY TEXTS IN A PROCESSING MODULE AND ARRANGEMENT FOR THE IMPLEMENTATION OF THE METHOD

BACKGROUND OF THE INVENTION

1. Field of the Invention

The present invention is directed to a method for processing variable service data structures and display texts in a processing module, and to an arrangement for implementation of the method, and in particular to a method and arrangement which allow the output of modified display texts dependent on a change in a new postage fee schedule table in a postage computer module, which are suitable for users of postage-calculating postage meter machines, postage-calculating scales or similar processing modules for service data.

2. Description of the Prior Art

U.S. Pat. Nos. 5,490,077 and 5,606,508 (corresponding to German PS 42 13 278) disclose the initiation of a loading of data into a postage meter machine on demand, wherein the data base is updated dependent on conditions (such as, for example, name, date) after the postage meter machine is switched on. In order to provide the majority of postal customers with a fee schedule table on time, the schedule is stored in a memory of a transmission means (a chip card or a cell of a GSM network) separately from the postage meter machine far before the effective date of the modified schedule. When the postage meter machine is switched on, the date of the calendar module of the postage meter machine is employed, or is operated on with further conditions that have been entered, in order to select the appropriate table, this being loaded into the memory of the postage meter machine when it is initialized. An updating of the previous table ensues when loading from a memory of the transmission means into the memory of the postage meter machine.

U.S. Pat. No. 5,710,706 (corresponding to German PS 44 47 404) discloses entering data into a scale that is connected to a postage meter machine via an interface in order to update fee schedule table data with new data. The loading of the data ensues from a remote data center by modem to the postage meter machine. The loading and updating ensue immediately after one another. When the criterion exists for the schedule table data to be updated, a loading ensues, possibly with an intermediate storage of fee schedule table data in the postage meter machine, and a sector-by-sector deletion of the old postage table ensues in the non-volatile memory of the scale before the transmission of the new fee schedule table data from the intermediate memory of the postage meter machine to the scale and the write-in of the new fee schedule table data into the non-volatile memory of the scale. A number of tables can be stored in the scale, however, each table refers to a separate mail carrier, which can be selected by a keyboard. The minimum (earliest) validity date of a fee schedule table allocated to a carrier identification number CIN is stored and interpreted by the postage meter machine in order to form request data as needed for loading new fee schedule table data, or for updating in the memory of the scale according to the CIN.

U.S. Pat. No. 5,448,641 discloses a postal fee system with validity check in the terminal equipment at the user side. The postage fee schedule table is transmitted from the data center to the terminal equipment. A code belonging to the postage fee schedule table is also transmitted from the data center to the terminal equipment. The terminal equipment generates a comparison code from information based on the received postage fee schedule table. The validity of the received postage fee schedule table can be checked in the terminal equipment on the basis of the comparison of the received code to the generated comparison code. Such a solution is suitable for instances wherein only the fee schedule content, but not the structure of the fee schedule table, is modified.

German OS 196 22 304 discloses an interchangeable postage computer module and method for data transmission. For a change in the fee schedule structure, the postage computer module is replaced, which can be coupled both to a scale as well as to a postage meter machine. The coupling of the postage computer module to a base device must be implemented by the user. In conformity with the new structure, it supplies data for display change to a base device. A presentation of screen images ensues via the display unit of the base device, for which purpose ASCII display texts must be correctly ordered into the respective menu. This solution, however, is only suitable when the screen images stored in the program memory can be retained. Given very different base devices that have respectively different user interfaces, such procedure encounters substantial difficulties. This solution is unsuitable when previous screen images are discarded and entire screen images must be newly created and accommodated in the program because the structure of the presentation has fundamentally changed. Of course, it is disadvantageous when, in addition to the postage computer module, the program memory of the base device also has to be replaced.

In earlier postage meters the shipping parameter texts were differently displayed dependent on the machine. All texts were deposited in a memory exclusively provided for the operating software. Given a modification of the texts, the operating software of the machine had to be replaced, i.e. a technician replaced the operating software of the machine on site at the customer. As a result, the costs were very high. Another alternative for the presentation of the individual shipping parameters were keyboard foils that were glued onto the keyboard of the machine. A shipping parameter was allocated to each key. Given the change of only one shipping parameter, the complete keyboard foil had to be replaced. High costs likewise arose as a result. A need existed to reduce the replacement hardware elements.

SUMMARY OF THE INVENTION

An object of the present invention is to provide an arrangement and a method for processing variable service data structures and display texts in a processing module in order to present display texts in the base device, these corresponding to the modified service data structures, which avoid the aforementioned problems associated with known techniques and devices. A further object us to provide an arrangement and a method for processing variable fee schedule structures and display texts in a postage computer module which allow the display of display texts in the base device that correspond to the modified postage fee schedule structures.

The above object is achieved in accordance with the principles of the present invention in a method for processing variable service data structures and display texts in a processing module having a microprocessor, a program memory in which an operating program for the microprocessor is stored, and a non-volatile service data memory having first and second memory areas, wherein service data are stored in the second memory area and a root table is stored in the first memory area, the root table having a number of table items respectively associated with pointers for the addresses of the service data in the second memory area, and wherein access to the second memory area from the microprocessor ensues exclusively through the root table by selection of a table item, within the context of the operating program, and with service data being supplied to the microprocessor from the second memory area from an address identified by the pointer for the selected table item.

Inventively, all display texts are no longer stored in the program memory of the base device; rather, a separate non-volatile memory or memory area is provided for the display texts, preferably in combination with the postage calculation. A structure stored in a further, separate memory area includes pointers that point to the next-successive tables in the other memory areas. These aforementioned memory areas are inventively located in the non-volatile service data memory for postage fee schedule tables. The next-successive tables are tables for the postage fee schedules and the shipping parameter texts to be indicated. The latter are presented via the display of the base device. The shipping parameter texts show the user of the base device those elements in the structure of the postage calculation in the postage computer that can be selected. The shipping parameters relate to the format, the type, the form and the destination of the mail to be sent. The operating program of the base device is modified such that stored, invariable, fixed screen images are not exclusively accessed; rather, the screen images are generated in the display before being displayed, with the microprocessor programmed to follow the pointers when running the program.

For modifying fee schedule structures and display texts, the tables for the postage fee schedules and the shipping parameter texts to be indicated are either replaced or are reloaded into the appertaining memory areas of the non-volatile service data memory. Subsequently, thus, the new shipping parameter texts are also available for the display. When calculating the postage, the microprocessor programmed by the operating software accesses the aforementioned memory areas. A stored organization of pointers that point to the start addresses of the individual tables that are respectively stored in the separate memory areas is present at a start address known to the operating software. This organization lies at the root of all tables for the postage calculation and is therefore referred to below as a root table. The operating software accesses the respective table memory areas via the root table.

The operating software is designed for a reloading of the aforementioned memory. Since the memory addresses for the tables of the postage fee schedules and shipping parameter texts are known from the root table, the content of the memory areas can be designationally reloaded. For such a reloading, the root table stored in the service data memory contains further information sets that are interpreted by the aforementioned microprocessor programmed by the operating software, and which may be communicated to the data center by modem. The further information include the version and country identifier of the fee schedule table.

DESCRIPTION OF THE DRAWINGS

FIG. 3*a* shows memory areas of a service data memory for a number of carrier tables in accordance with the invention.

FIG. 3*b* shows memory sub-areas of one of the carrier tables in accordance with the invention.

FIG. 4 shows an example of the texts stored in a table in accordance with the invention.

DESCRIPTION OF THE PREFERRED EMBODIMENTS

Figure 1:
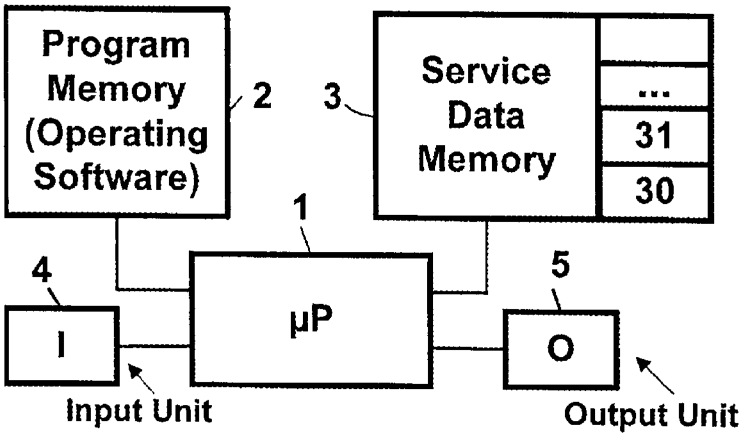
FIG. 1 is a block circuit diagram of a processing module in accordance with the invention.

FIG. 1 shows a block circuit diagram of a processing module, composed of a microprocessor 1 that is connected to a program memory 2, a service data memory 3 as well as to an input unit 4 and an output unit 5. The microprocessor 1, the program memory 2 as well as the input and output units 4, 5 can be components of a base device (not shown) that has a suitable human/machine interface (user interface). The input and output units 4, 5 are then components of the user interface.

For example, the base device can be a franking device that requires the processing module as a postage computer. The input and output units 4, 5 are then interfaces to the user interface. In the postage calculation, texts are displayed in the display of the user interface in order to enable selection inputs, for example by keyboard.

The service data memory 3 contains a first memory area 30 for a root table that contains pointers to at least one second memory area 31. Data for display texts are additionally stored in the second memory area 31. These service data can be replaced by loading from an external memory. The microprocessor 1 is programmed for loading the display texts in common with the loading of the other service data and the root table. The latter is provided for the access to the display texts and to the other service data. The program memory 2 contains a program with which the microprocessor 1 is programmed for accessing the at least one second memory area 31 via the root table stored in the first memory area 30, and for generating screen images with the calculated data and display texts from the memory areas of the service data memory 3.

The microprocessor 1 is a component of a base device or is connected thereto, and the input and output units 4, 5 are components of the user interface of the base device. The output unit 5 can be a display screen. The display texts are stored in common with or separately from the other service data in the form of tables. The program in the program memory 2 is fashioned for the display of the display texts in the generated screen images via the output unit 5 of the base device.

The invention proceeds from the need of some mail carriers to arbitrarily modify the service data. The postage fee schedule memory 3 can be fashioned in a further version as an interchangeable, non-volatile memory element, for example an EPROM. The processing module in this version has a motherboard (not shown) with a plug socket for such memory components.

In particular, the service data include the fees in postage fee schedule tables and the appertaining shipping parameter texts. The service data required in a postage computer module or processing module are reloaded on demand, whereupon a status report is communicated to the data center. A method for data input into a service device and an arrangement for the implementation of this method as disclosed in German Patent Application P 198 43 249.6 can be employed. The status report is interpreted in the data center in order to make advantageous proposals for storing service data to the base device. A method for data input into a postage computer and an arrangement for the implementation of this method as disclosed in German Patent Application P 198 43 252.6, assumes that the loading of new fee schedule table data ensues at a user-defined, first point in time, and that the updating of new fee schedule table data ensues at a second point in time defined by the respective mail carrier. The aforementioned method can be correspondingly supplemented with respect to the inventive loading of shipping parameter texts.

The processing module is an integrated electronic postage computer. The base device or terminal device is preferably an electronic postage meter machine or a postage computing scale. An electronic postage meter machine having a fee schedule table reloading capability is disclosed in greater detail in German PS 42 13 278 and a postage calculating scale is disclosed in greater detail in German PS 44 47 404. German Patent Application P 198 30 055.7-53 discloses a method for the secure transmission of service data to terminal equipment and an arrangement for the implementation of this method, which can be modified to incorporate the present invention only insofar as the service data also include the appertaining shipping parameter texts that can be reloaded.

The base device is connected to a postage calculating module or is equipped for postage calculating. The microprocessor of the base device or of the postage calculating module is programmed to undertake a storage of the new postage fee schedule table data and of the appertaining shipping parameter texts in the memory of the postage calculating module. Optionally, a check sum can be formed over the stored, new postage fee schedule table data and can be communicated to the data center. The data center sends an OK message to the base device or to the postage computer, which switch into an operating mode.

Advantageously, communication from the data center by modem can ensue directly with the processing module in the base device, or indirectly via the base device with the postage calculating module.

The information communicated to the data center preferably contains an identification of the terminal device (for example, a PIN), a version number and the check sum over the service data or an encrypted check sum or a signature. The new service data (intermediately) stored and the processing module or base device can thus be advantageously identified in the data center and their proper or faulty (intermediate) storage can be verified. The postage calculating module can be integrated in the base device or arranged separately from the base device. The base device is preferably a postage meter machine, with a symmetrical encryption algorithm for forming an encrypted check sum and a secret key being securely stored in the postage meter machine. Alternatively, the postage calculating module is integrated into a scale. In such a case, an asymmetrical encryption algorithm is preferably stored for forming an encrypted check sum and a public key is stored in the scale, because the public key is allowed to be stored unprotected.

Figure 2:
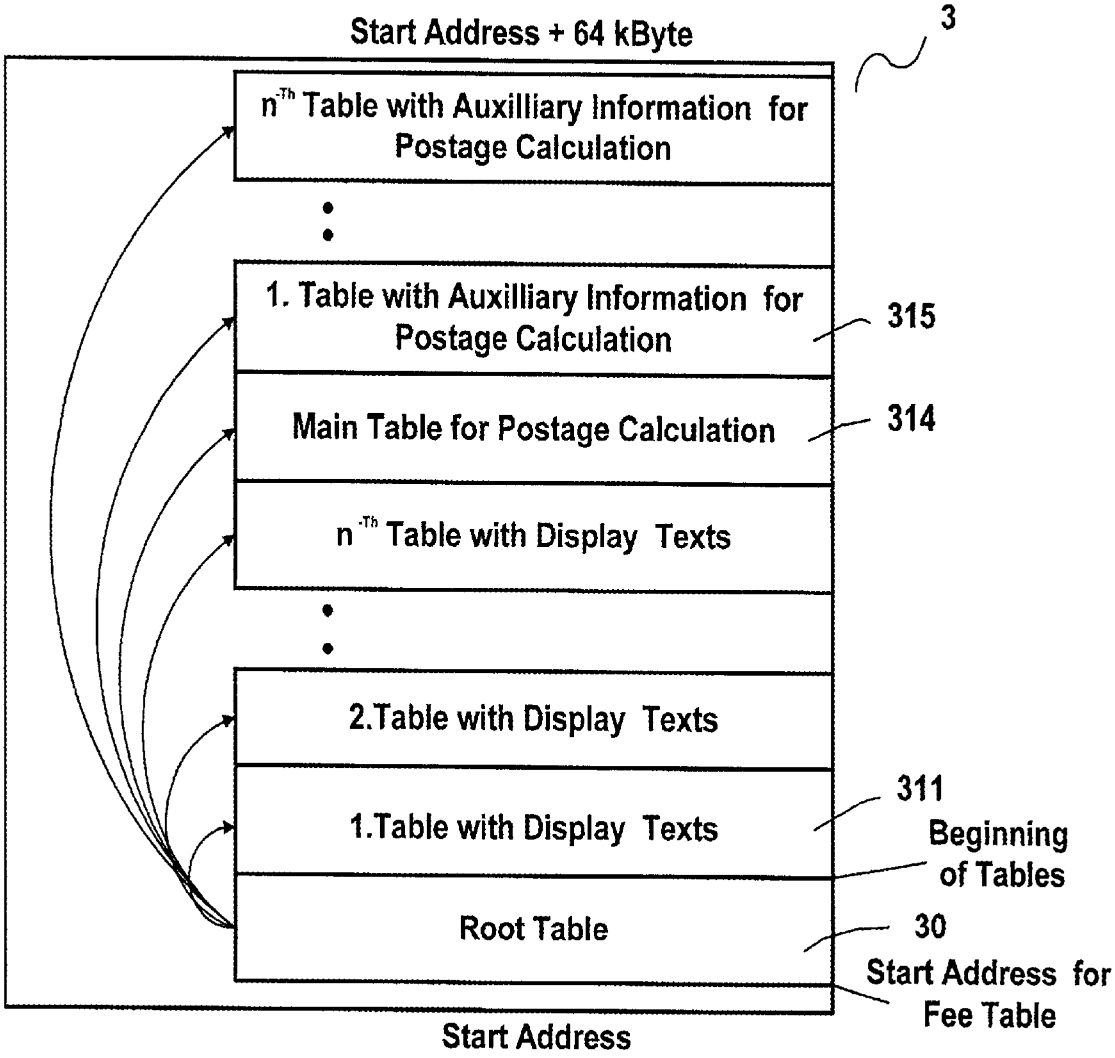
FIG. 2 shows the memory areas of a service data memory for root table and main table as well as for a display text table in accordance with the invention.

FIG. 2 shows the memory areas of a service data memory 3 for root and main tables as well as for a display text table that, for example, are required in combination with a postage calculation.

A first memory area 30 is provided for a root table and the other memory sub-areas 311, 314 and 315 of the second memory area 31 are provided for the tables with display texts, for the main table for postage calculating and for tables with auxiliary information for postage calculating. The main table (main_table) in this example is the table in the memory sub-area 314 from which a postage value can be defined when weight data and shipping parameter data are input. The service data memory 3 is preferably an $E^2$PROM memory module or a FLASH module. A number of structures and tables are stored therein that contain all the information that are needed in order to calculate a postage value from weight and a combination of shipping parameters. The address under which specific data are stored is precisely defined in the memory administration of the operating software of the postage meter machine. This also includes the address at which the root table can be found.

The first memory area 30 contains this root table beginning with a start address. A further address identifies the beginning of the memory areas with the tables. For example, 64 kbyte memory space for a carrier table is provided in the second memory area 31 beginning with the fixed starting address. All information that, following this start address, is contained in the $E^2$PROM memory in the area start address plus 64 kbyte is allocated to the carrier table 31 by the operating program. At least one first table with display texts and a first main table for postage calculation are provided. Further tables with display texts and, if needed, a first table with auxiliary information for postage calculation can also be contained. A table is only one possible form of storage. The display texts that are output on the display 5 can, alternatively, be stored in the memory area 31 in some other form of storage. Moreover, the root table can additionally contain text strings stored therein that are output in the display. Possible text strings are a country identifier, a designation of the carrier table, for example "fee schedule table of the USPS".

FIG. 3*a* shows the memory areas of a service data memory for a number of carrier tables. One of the memory areas is the memory area 30 provided for a root table. The other memory areas 31 through 35 are provided for the various carrier tables.

FIG. 3*b* shows that the shipping parameter texts listed, for example, in a table 1 can be contained in the memory sub-area 331 of the memory 33 for a third carrier table of the service data memory 3. In addition to the memory sub-areas 331, 332, 333,334, 335, 336 etc., of the carrier table 33 from the number of carrier tables 31 through 35, there is again a root table in the memory sub-area 330 as A starting point for the access onto the other memory sub-areas 331, 332, 333 334, 335, 336 etc. Two root tables are advantageous when the postage tables of a number of carriers are stored in the memory area (FIG. 3*a*). The further memory area (FIG. 3*a*) is then fashioned correspondingly larger. The first root table in the memory area 30 serves the purpose of accessing the corresponding postage table of the selected carrier from a number of carriers 31 through 35. The microprocessor 1 finds which carrier is to be utilized from the first root table. For reading the display texts belonging to the postage table or for calculating a postage value with the postage schedule, the data are accessed via the second root table (FIG. 3*b*). With the assistance of the second root table in the memory sub-areas 330, the microprocessor 1 arrives at the addresses of the tables with the display texts. With the second root table, the microprocessor 1 can additionally present the corresponding text strings for this carrier on the display. The root table in the memory sub-area 330 is fundamentally comparable to that stored in the memory area 30. A table 1 with display texts is stored in the memory areas 311 (FIG. 2) or 331 (FIG. 3*b*). The other memory areas 332–336 can contain auxiliary tables with further display texts.

The base device is a postage meter machine with integrated postage computer or a postage calculating scale and has a display available to it in which texts and other information for the postage calculation can be displayed. These texts can have the following content:

Shipping parameter texts in order to illustrate the valid postage structure for the corresponding mail carrier;

- Status information such as, for example, postage value and weight and error messages;
- Other information such as, for example, menu texts and specific texts for special functions.

For the postage calculation, the shipping parameters must be output on the display so that the operator can select the corresponding entries. Given a change in postage, it often occurs that the shipping parameters change. A shipping parameter can be eliminated (for example, there is no longer the class "printed matter" in Germany) or new shipping parameters can be added (in Germany, for example, "registered" is divided into "handover register" and "mail drop register"). Such postage changes normally occur more often than the modification of the operating software of a machine (postage calculating scale or postage meter machine). Given a change of the shipping parameters, the program memory 2 of the machine would have to be replaced if all texts to be output in the display were accommodated in the operating software. Inventively, however, there is a separate, non-volatile service data memory 3 within the processing module of the machine, which contains all information for postage calculating. Included in this information are:

- Texts that are output in the display and that represent shipping parameters from which the user selects his settings;
- Rules for the combination of the individual shipping parameters (what is allowed and what combinations are not possible) or rules for user prompting wherein unallowed combinations cannot be even selected at all;
- Rules for optimization possibilities of individual shipping parameters;
- Postage values that were calculated on the basis of settings made by the operator; and
- Special functions that are country-specific.

When the postage structure or individual postage values change, the carrier table in the service data memory is modified. The modification of the carrier tables in the memory areas of the service data memory is possible in various ways:

- Replacement of the EPROM or, respectively, EEPROM;
- Selective reloading by reading in the data from a chip card or some other external data store;
- Selective reloading by transmission of the data by modem or some other communication device from a data center, whereby the transmission can ensue via cable or radio network.

When modifying the postage values in the carrier table, the display texts are advantageously simultaneously adapted in a corresponding manner, since these texts are now likewise stored in the service data memory. In this way, the main table and the appertaining shipping parameter texts are always at the same current status. The expensive replacement of the machine-internal EPROM with the operating software or the manufacture of keyboard foils is thus eliminated.

The operating software now accesses addresses that lie in the separate, non-volatile service data memory in order to output texts that are stored therein. The address area is designed such that the content of this service data memory can be separately reloaded. The data stored in the separate memory areas are exclusively structures and tables whose content is constant. No implementable, code is located in this memory. Given changes in the postage structure and the fees, only these tables and structures are updated. The operating program thus need not be modified.

The operating software for the corresponding machine is prepared in a stable condition. This software is in the position to reload data into the service data memory. These data can also be information about the postage structure. Included among the information about the postage are:

- Particulars about postage values of the individual shipping parameters;
- Particulars about the combination possibilities of the individual shipping parameters (which shipping parameters are allowed and allowed to be combined with one another);
- Description of the shipping parameters, i.e. what is this shipping parameter called (for example, letter or pickup) and how is this shipping parameter defined for machine-internal employment;
- Other texts that are output in the display;
- General information such as, for example, version of the postage table, validity date, country identifier;
- Particulars about the automatic selection of selective imprint information on the basis of the shipping parameters that have been set;
- Particulars about optimization possibilities of the shipping parameters, i.e. which type of shipping is more beneficial;
- Particulars about the format indications of the individual shipping parameters, i.e. to the sizes of the individual letters lie within the prescribed limits.

The arrangement of the first memory area and its effect on the allocation of the memory content of the service data memory shall be discussed below, to enable the operating software to read all information in the memory. Only the part of the service data memory that contains information about the postage structure will be considered. It satisfy the requirement that the operating software is generated at a specific point in time x, i.e. compiled and linked to a runnable program. This operating software thus knows where each information set resides in the service data memory, and upon a need (request) for a particular data set, it determines that this lies under a specific address in the memory space from the addresses known to the operating software.

In order to be able to read each information set in the separate memory areas, pointers that indicate the individual tables with information in the separate memory lie at a start address known to the operating software. These pointers indicate the start addresses of the individual tables. These pointers are accommodated in the root table.

The following, important information are stored in the tables:

- Text to be output for the shipping parameters;
- Machine-internal definition of the shipping parameter.

EXAMPLE

```
typedef for shipping _Tab Type
{
UNIT 16 Index;            /*Indexvariable */
UCHAR Disp/               /*text string to be output in the display*/
Text[MAX_VER];
UNIT 16 Inter_key;        /*Constant for machine-internal processing*/
UNIT 32 KeyZiel;          /*Constant for machine-internal processing*/
UNIT32 ZielMaske;         /*Constant for machine-internal processing:/
UNIT32 KeyArt:            /*Constant for machine-internal processing*/
UNIT 32 ArtMaske;         /*Constant for machine-internal processing*/
...;                      /*Additional structure variables are possible
                          dependent on demands*/
} ShippingType;
```

The text for the shipping parameter to be output is stored as a string variable. The maximum number of possible characters is predefined and different on the basis of the display size and division. Different string lengths are possible dependent on the structure of the display window.

The access to the content of the table ensues in the following way: The root table that contains pointers to the individual start addresses of the tables in the separate memory areas is located in the service data memory under a specific address. The tables with the strings to be output in the display are located at different locations in the service data memory. When the software is compiled and linked, the compiler or linker determines the addresses under which the individual software parts are accommodated in the service data memory at the time of the translation. These addresses are stored in the root table so that the operating software can access the individual tables in the service data memory.

The following situation then occurs given reloadable software: The operating software that is installed in the machine (for example, scale or postage meter machine) was compiled at a point-in-time x. The operating software knows where it must look for the root table in the service data memory. The tables in the separate memory areas are accessed via the root table. When a new postage table for the status of the operating software that already is present is generated at a later point-in-time, the tables in the service data memory again lie at different locations than in the most recent version of the postage table that was generated at point-in-time x. The pointers to the tables are stored in the root table. The start addresses of individual tables now differ from those of the software generated at point-in-time x. The operating software always takes the route via the root table when accessing the tables. In this way, the content (and thus the strings for the output in the display) and the size of the individual tables can change without having to modify the operating software. The root table is thus the port to the information stored in the separate memory areas.

FIG. 4 shows an example of the storage of texts that are output in the display of the base device. The storage ensues in the form of a table, for example Table 1. A memory sub-area 331 of a memory area 33 is provided for this Table 1.

The table is composed of a number of columns. The individual columns have the following content:

First column: Index for machine-internal processing

Second column: Text string that is output in the display

Third column: ID identifier for machine-internal processing in order to be able to automatically select the suitable selective imprint from the inputs of the user (selective imprint selection identifier)

Fourth column: VA identifier for machine-internal processing in order to determine the postage value from the inputs of the user within the main table "main_table"

Fifth column: VA-M identifier for machine-internal processing in order to determine the postage value from the inputs of the user within the main table "main_table"

Sixth column: VZ identifier for machine-internal processing in order to determine the postage value from the inputs of the user within the main table "main_table"

Seventh column: VZ-M identifier for machine-internal processing in order to determine the postage value from the inputs of the user within the main table "main_table"

The identifier for the machine-internal processing is in the form of constants that were set in the area of the memory area 31. These constants are different values and serve for the exact definition of the shipping type and of the shipping destination as well as for the necessary masking in order to be able to look for hits in the main table "main_table". For a simpler explanation of Table 1, only names are presented instead of specific values. The designation BR identifies the identifier for the shipping type "letter". The designation IN identifies the identifier for the shipping destination "domestic". The selective imprint selection identifier K_BR_IN in the index line 0 thus means that a letter BR is to be sent domestic IN. An identifier VA_M identifies the masking for all shipping type, and another identifier VZ_M identifies the masking for all shipping destinations that were declared in the memory area 31. In practice, suitable numerical values corresponding to the shipping type are entered in the fourth column for the software. Numerical values suitable for the software in the fifth column identify the shipping type masking. Numerical values suitable for the software in the sixth column identify the shipping destination, i.e. countries or regions or common market regions. Numerical values suitable for the software in the seventh column identify the shipping destination masking.

The following, further designations can be selected for simpler explanation: IB for info letter, IP for info mail, PK for postcard, BU for book shipment or PA for package. The designations EU and WE stand for Europe-wide and for world-wide shipping, respectively.

The operating software of the machine accesses the individual table elements and outputs the text strings in the display. The microprocessor 1 is programmed such for generating screen masks so that it employs the display texts from the memory areas of the service data memory 3 for generating screen images, the screen images being generated such that the operator can only set the shipping parameter combinations that are allowed by postal authorities. Usually, the shipping type (letter, package, info letter, postcard) will be selected first, and then the shipping destination (domestic, Europe, world), and the surcharge will then be selected (mail drop register, return receipt, C.O.D. airmail, etc.). The operator prompting with generated screen images in the selection of the shipping parameters shall be illustrated with reference to an example:

| Selected Parameter | Option |
|---|---|
| Domestic letter | Mail drop register<br>Handover register<br>Return receipt<br>COD<br>Autograph<br>Insured letter |

After the selection of handover register, a screen image having the following user information or instructions is opened:

| Selected Parameter | | Option |
|---|---|---|
| Domestic letter | Handover register | Return receipt<br>Autograph |

After selection of the second shipping form:

| Selected Parameter | | Option |
|---|---|---|
| Domestic letter | Handover register<br>Autograph | Return receipt |

Different fee schedules as well as different shipping parameter texts are valid for other countries. The inventive solution is also advantageous for a different country version since a country version can be generated without modification of the operating program merely on the basis of the exchange data in the service data memory. In many countries, a distinction must be made as to which shipping parameters are allowed to be combined with one another and which not. For every input by the user, the shipping parameter combination current at the moment must be checked with the assistance of the main table as to whether the combination is allowed.

In the USA, for example, a distinction must be made between allowed and unallowed combinations. The shipping type (first class, priority mail; third class, parcel post; express; international letter; international small packet; international parcel; international express) is therefore usually selected first and the allowability of the combination is then checked. The check of the allowability of a combination can be omitted on the basis of the inventive operator prompting if the operator does not have the possibility of selecting an arbitrary combination from all shipping forms. The generated screen images only allow the input of allowed combinations of shipping parameters. During the course of the postage calculation, the operator prompting is fashioned on the basis of a country-specific table—analogous to Table 1 shown in FIG. 4—so that, after selection of the shipping type (for example, first class, priority mail), all shipping forms that are possible in combination with the selected shipping type according to the postal regulations are offered as option (italics), i.e.:

| Selected Parameter | Option |
|---|---|
| 1st class, Priority Mail; | Registered Mail;<br>Insured Mail;<br>Certified Mail;<br>C.O.D.;<br>Special Delivery;<br>Return Receipt; |

When the operator now selects one of the offered forms of shipping (for example, "registered mail"), then only those shipping forms that can be combined with the shipping form already selected are displayed (italics), i.e.

| Selected Parameter | | Option |
|---|---|---|
| 1st class, Priority Mail | Registered Mail | C.O.D.;<br>Special Delivery;<br>Return Receipt; |

After selection of the second shipping form (for example, "special delivery"), those shipping forms (italics in the right column) that can be combined with the shipping forms already selected continued to be displayed, i.e.:

| Selected Parameter | | Option |
|---|---|---|
| 1st class, Priority Mail | Registered Mail<br>Special Delivery | C.O.D.;<br>Return Receipt; |

It is always possible to return to the start menus in order to again undertake a selection of the shipping type and to then undertake the shipping form corresponding to the type already selected. When the input of a value is required in the postage calculating menu, the user is prompted with the assistance of an additional instruction displayed by the display to input a value. The same is true of the input of the country code given foreign mail or of the zip code input given calculation of postage in the USA. When the country code or, respectively, the zip code is required for the calculation of the postage value, the user enters the values after a corresponding prompt displayed by the display.

The service data, of course, also can refer to other purposes such as, for example, producing, administering cost centers for a department-by-department accounting or for accounting for clients, whereby other specific display texts must be generated for a different mail carrier, particularly for internationally acting private carriers.

Although modifications and changes may be suggested by those skilled in the art, it is the intention of the inventor to embody within the patent warranted hereon all changes and modifications as reasonably and properly come within the scope of her contribution to the art.

I claim as my invention:

1. A method for processing variable service data structures in a processing module, comprising the steps of:

providing a processing module having a microprocessor and a program memory accessible by said microprocessor, and storing an operating program in said program memory for operating said microprocessor;

providing a non-volatile service data memory in said processing module and dividing said service data memory into a first memory area and a second memory area;

dividing said second memory area into a plurality of memory sub-areas and storing variable service data, having an effective date, comprising calculation tables and display texts, at respective addresses in said memory sub-areas;

storing a root table for said service data in said first memory area, said root table containing table items respectively associated with pointers for said addresses; and accessing said second memory area from said microprocessor exclusively through said root table within said operating program by selecting, within said operating program, a table item and supplying said service data to said microprocessor from said second memory area from an address identified by the pointer for the selected table item.

2. A method as claimed in claim 1 comprising, for replacing said service data with new service data, loading said new service data into said service data memory from a source of said new service data external of said processing module.

3. A method as claimed in claim 1 comprising, for replacing said service data with new service data, providing a new service data memory containing said new service data and replacing said service data memory in said processing module with said new service data memory.

4. A method as claimed in claim 1 wherein said calculation tables comprise postal fee schedule structures and wherein said display texts comprise postal display texts, and wherein said operating program includes a routine for postage calculation, and comprising the step of accessing said second memory area from said microprocessor through said root table when said routine for postage calculation occurs in said operating program and supplying a selected fee schedule structure to said microprocessor for use in said postage calculation routine and for simultaneously displaying one of said postal display texts on a visual display.

5. A method as claimed in claim 1 wherein said root table is a first root table, and comprising the additional steps of:

providing a plurality of further memory areas in said service data memory;

dividing each of said further memory areas into a plurality of further memory sub-areas, each having an address;

storing sub-sets of said service data respectively in said further memory sub-areas;

providing a second root table in each of said further memory areas containing table items with pointers respectively associated therewith for the addresses of the further memory sub-areas in that further memory area; and accessing said further memory areas from said microprocessor exclusively through said first root table and the respective second root tables within said operating program by selecting a table item in said first root memory within said operating program which, in turn, causes a selection of a table item in one of said second root tables, and supplying the service data, stored in the further memory sub-area having an address designated by the pointer associated with the selected table item in said one of said second root tables, to said microprocessor.

6. A method as claimed in claim 5 comprising selecting a plurality of said second root tables via a single selected table entry in said first root table, and supplying the service data from a plurality of further memory sub-areas, respectively having addresses associated with a plurality of respective pointers in said plurality of second root tables selected by said single table entry in said first root table, to said microprocessor.

7. An arrangement for processing variable service data structures and display texts comprising:

a processing module having a microprocessor and a program memory, accessible by said microprocessor, in which an operating program is stored for operating said microprocessor;

a non-volatile service data memory in said processing module, said service data memory being divided into a first memory area and a second memory area;

said second memory area being divided into a plurality of memory sub-areas in which variable service data, having an effective data, are stored at respective addresses, said variable service data comprising calculation tables and display texts;

said first memory area containing a root table for said service data, said root table containing a plurality of table items respectively associated with pointers for said addresses; and said microprocessor accessing said second memory area exclusively through said root table within said operating program by selecting a table item within said operating program and thereby causing said service data to be supplied to said microprocessor from said second memory area from an address identified by the pointer for the selected table item.

8. An arrangement as claimed in claim 7 wherein said microprocessor is programmed for loading said calculation tables, said display texts and said root table in common.

9. An arrangement as claimed in claim 7 wherein said service data memory is an interchangeable memory component which is removable from said processing module.

10. An arrangement as claimed in claim 7 wherein said root table is a first root table, and wherein said service data memory has a plurality of further memory areas each of said further memory areas being divided into a plurality of further memory sub-areas, each having an address with, sub-sets of said service data being stored respectively in said further memory sub-areas, each of said further memory areas having a second root table therein containing table items with pointers respectively associated therewith for the addresses of the further memory sub-areas in that further memory area, and said microprocessor accessing said further memory areas exclusively through said first root table and the respective second root tables within said operating program by selecting a table item in said first root memory within said operating program which, in turn, causes a selection of a table item in one of said second root tables, the service data, stored in the further memory sub-area having an address designated by the pointer associated with the selected table item in said one of said second root tables, being to said microprocessor.

11. An arrangement as claimed in claim 10 wherein said microprocessor selects a plurality of said second root tables via a single selected table entry in said first root table, with the service data from a plurality of further memory sub-areas, respectively having addresses associated with a plurality of respective pointers in said plurality of second root tables selected by said single table entry in said first root table, being supplied to said microprocessor.

12. An arrangement as claimed in claim 7 further comprising:

a base device containing said processing module;

an input unit connected to said microprocessor forming a user interface to said base device for allowing a user to intervene in said operating program to select one of said table items in said route table; and a display screen connected to said microprocessor for visually presenting said display texts.

13. An arrangement as claimed in claim 12 wherein said base device comprises a franking device and wherein said processing module comprises a postage calculating module and wherein said calculation tables comprise postage fee tables for use in calculating a postage value by said postage calculating module, and wherein said display texts comprise shipping parameter texts.

14. An arrangement as claimed in claim 13 wherein said microprocessor is programmed for generating screen images on said display screen, incorporating said shipping parameter texts, said screen images presenting a user option for entering only permissible combinations of shipping parameters, represented within said shipping parameter texts, via said input unit.

15. An arrangement as claimed in claim 12 wherein said base device comprises a postage calculating scale and wherein said processing module comprises a postage calculating module and wherein said calculation tables comprise postage fee tables for use in calculating a postage value by said postage calculating module, and wherein said display texts comprise shipping parameter texts.

16. An arrangement as claimed in claim 15 wherein said microprocessor is programmed for generating screen images on said display screen, incorporating said shipping parameter texts, said screen images presenting a user option for entering only permissible combinations of shipping parameters, represented within said shipping parameter texts, via said input unit.

* * * * *